United States Patent [19]

Mimori et al.

[11] Patent Number: 5,476,989
[45] Date of Patent: Dec. 19, 1995

[54] ADSORBENT OF RADIOACTIVE NUCLIDES AND PROCESS FOR VOLUME-REDUCTION TREATMENT OF RADIOACTIVE WASTE

[75] Inventors: Takeo Mimori; Kazutoshi Miyajima; Kouichi Nemoto; Takeshi Nakano, all of Ibaraki; Hirotaka Masui, Nara; Tadahiro Mori; Hideki Takahashi, both of Kyoto, all of Japan

[73] Assignees: Unitika Ltd., Hyogo; Japan Atomic Energy Research Institute, Tokyo, both of Japan

[21] Appl. No.: 43,815

[22] Filed: Apr. 7, 1993

[30] Foreign Application Priority Data

Apr. 7, 1992 [JP] Japan ................................. 4-114115

[51] Int. Cl.⁶ .................................................. G21F 9/00
[52] U.S. Cl. ........................... 588/20; 588/19; 502/416; 423/447.1; 210/679; 210/682; 976/DIG. 383; 976/DIG. 384
[58] Field of Search ........................... 252/626, 628, 252/631; 428/357, 367; 502/416, 418; 423/447.1, 447.2; 588/1, 19, 20; 210/679, 682; 976/DIG. 383, DIG. 384

[56] References Cited

U.S. PATENT DOCUMENTS

| | | | |
|---|---|---|---|
| 4,222,892 | 9/1980 | Motojima et al. | 252/428 |
| 4,366,085 | 12/1982 | Ikegami et al. | 252/431 |
| 4,391,616 | 7/1983 | Imamura | 55/35 |
| 4,496,664 | 1/1985 | Motojima | 502/402 |
| 4,508,851 | 4/1985 | Izumi et al. | 502/426 |
| 4,576,929 | 3/1986 | Shimazaki | 502/417 |
| 4,772,455 | 9/1988 | Izumi et al. | 423/210 |
| 4,772,508 | 9/1988 | Brassell | 428/218 |
| 4,831,011 | 5/1989 | Oikawa et al. | 502/406 |
| 5,082,594 | 1/1992 | Tsuzuki et al. | 252/502 |
| 5,143,889 | 9/1992 | Takahiro et al. | 502/427 |
| 5,194,158 | 3/1993 | Matson | 210/651 |
| 5,236,596 | 8/1993 | Wang et al. | 210/669 |
| 5,256,338 | 10/1993 | Nishi et al. | 252/628 |

FOREIGN PATENT DOCUMENTS

| | | |
|---|---|---|
| 0061924 | 3/1982 | European Pat. Off. . |
| 60-51491 | 11/1985 | Japan . |
| 63-24415 | 5/1988 | Japan . |

OTHER PUBLICATIONS

Japanese Newspaper Nikkei Sangyo, May 15, 1992, "Adsorption of 90% Plutonium, Unitika has Developed Fibrous Active Carbon—Waste volume reduced to 1/200 by after–use incineration".

*Primary Examiner*—Ngoclan Mai
*Attorney, Agent, or Firm*—Sughrue, Mion, Zinn, Macpeak & Seas

[57] ABSTRACT

An adsorbent useful for the adsorption of radioactive nuclides which comprises fibrous active carbon having a specific surface area of 1,000 m²/g or more and an equilibrium moisture regain of 10% or more at a relative humidity of 45%; and a process for the volume-reduction treatment of radioactive liquid waste which comprises subjecting radioactive liquid waste containing radioactive nuclides to an adsorption treatment using an adsorbent comprising fibrous active carbon having a specific surface area of 1,000 m²/g or more, and subsequently subjecting the spent adsorbent to an incineration treatment at a temperature which is equal to or higher than the ignition point of the fibrous active carbon.

7 Claims, No Drawings

ADSORBENT OF RADIOACTIVE NUCLIDES AND PROCESS FOR VOLUME-REDUCTION TREATMENT OF RADIOACTIVE WASTE

FIELD OF THE INVENTION

This invention relates to an adsorbent useful for the adsorption of radioactive nuclides which generate, for instance, in the course of reprocessing steps for the separation and recovery of valuable substances such as uranium, plutonium and the like from nuclear fuel used in a nuclear reactor, and to a process for the volume-reduction treatment of radioactive waste that contains radioactive nuclides.

BACKGROUND OF THE INVENTION

Various types of liquid waste accumulated at reprocessing facilities after treatment of spent nuclear fuel discharged from nuclear power stations contain many radioactive nuclides including long-lived $\beta$ and $\gamma$ nuclides of cesium and the like and transuranium elements such as uranium, plutonium and the like. For the treatment of radioactive liquid waste, it is necessary to reduce the amount of radiation by separating and removing radioactive nuclides from the liquid waste in order to reduce radiation exposure.

In general, radioactive liquid waste is treated by means of evaporation concentration, coagulating sedimentation, ion exchanging and the like.

In the evaporation concentration process, liquid waste to be treated is put in an evaporator and heated under atmospheric or reduced pressure to allow only moisture to evaporate, thereby concentrating the radioactive liquid waste to a reduced volume. The evaporated moisture is recovered using a condenser. On the other hand, the thus concentrated liquid waste is subjected to further treatment such as bituminization or the like depending on the radioactive nuclides present in the waste.

The evaporation concentration process, however, has disadvantages in that because corrosion-resistant materials are required, the decontamination factor (DF) decreases due to evaporation of radioactive nuclides which also occurs and the volume-reducing effect is not sufficient.

In the coagulating sedimentation process, radioactive nuclides in the liquid waste are removed after their coagulation and precipitation. Radioactive nuclide-including sludge in which the radioactive nuclides are incorporated is subjected to dehydration treatment, and the resulting residue is treated as solid waste, and the supernatant fluid is treated as low-level liquid waste.

In the coagulating sedimentation process, however, the sludge formed has a high moisture content which causes a difficulty in carrying out the dehydration treatment, thus entailing a disadvantage in that the volume-reducing effect is not sufficient.

In the ion exchanging process, ions of interest are removed from the liquid waste by conducting ion exchange using an ion exchange resin. The spent resin containing the ions of interest is treated as solid waste, and the liquid portion after the treatment is treated as low-level liquid waste.

A chelate resin may be used instead of an ion exchange resin in a process similar to the ion exchange process.

However, when an ion exchange or chelate resin which is commonly used for the removal of metals from general liquid waste is applied to the treatment of radioactive liquid waste, it is difficult to use such a resin because of the tendency toward deterioration of such an organic polymer resin due to the action of radiation. Even where such an application could be effected, a problem of selectivity occurs. For example, virtually nothing is known about an adsorbent useful for the selective separation and removal of transuranium elements such as plutonium and the like which are present in a small amount in liquid waste of high uranium content.

Inorganic adsorbents may have radioactive resistance, but nothing is known on an inorganic adsorbent which has excellent adsorptivity. On the other hand, an adsorbent in which a ferrocyanate as an inorganic functional group is supported on an acrylic fiber as an organic support is disclosed in JP-B-63-24415 (the term "P-B" as used herein means an "examined Japanese patent publication"). This adsorbent, however, has disadvantages in that the functional group is not selective for the adsorption of transuranium elements and the support, being organic, has poor durability.

Also, JP-B-60-51491 discloses a phenol-based chelate resin which has an aminomethylphosphonic acid-type functional group, and which is described as having excellent uranium-adsorbing ability. This resin, however, is not capable of selectively adsorbing plutonium present in radioactive liquid waste.

In addition to the above described disadvantages, the ion exchanging and chelate resin processes have other problems in that each of these processes generates a large quantity of secondary wastes such as incombustible or flame retardant spent resin, liquid waste after resin washing and the like, and insufficient volume-reducing effect arises.

Although the volume of spent organic ion exchange resin may be reduced by incineration, generation of harmful gas, formation of smoke dust and scattering of radioactive nuclides all occur. In addition to such problems, the resin cannot be incinerated completely, leaving a soft charcoal residue which causes another problem by scattering atomized dust containing radioactive nuclides when the residue is treated. As a result, incineration of this type of resin is practically impossible.

Thus, as has been described above, the prior art adsorbents have common problems in that they have poor durability against radiation and transuranium elements in radioactive liquid waste are not adsorbed selectively. In addition, the prior art volume-reduction treatment methods have problems in that secondary wastes are generated in a large quantity, insufficient volume-reducing effect arises and the facility cost becomes high because of the necessity to use corrosion-resistant materials.

SUMMARY OF THE INVENTION

In view of the above, therefore, an object of the present invention is to provide an adsorbent for radioactive nuclides, which is durable against radiation and is capable of adsorbing transuranium elements selectively.

Another object of the present invention is to provide a process for the volume-reduction treatment of radioactive waste, which enables significant volume reduction of radioactive nuclides-adsorbed waste and scattering of radioactive nuclides at the time of incineration does not occur.

To achieve these objects, the inventors of the present invention have conducted intensive studies and they have found that an adsorbent of a fibrous active carbon system with an inorganic framework, especially with a specified equilibrium moisture regain, adsorbs radioactive nuclides excellently, that plutonium present in plutonium-bearing liquid waste can be separated and removed selectively and securely by using such an adsorbent and that, by incinerating the fibrous active carbon with excellent adsorptivity at a temperature higher than its ignition point, the fibrous active carbon alone can be gasified and scattered substantially completely while preventing adsorbed radioactive nuclides from being scattered. The present invention has been accomplished on the basis of these findings.

Particularly, the present invention provides an adsorbent useful for the adsorption of radioactive nuclides which comprises fibrous active carbon having a specific surface area of 1,000 m$^2$/g or more and an equilibrium moisture regain of 10% or more at a relative humidity of 45%. The present invention further provides a process for the volume-reduction treatment of radioactive liquid waste which comprises subjecting radioactive liquid waste containing radioactive nuclides to an adsorption treatment using an adsorbent that comprises fibrous active carbon having a specific surface area of 1,000 m$^2$/g or more, and subsequently incinerating the adsorbent at a temperature higher than the ignition point of the fibrous active carbon.

In this instance, the specific surface area is calculated by the so-called BET method based on nitrogen gas adsorption isotherm at liquid nitrogen temperature.

These and other objects and advantages of the present invention will become apparent as the description progresses.

DETAILED DESCRIPTION OF THE INVENTION

Though not particularly limited, the material of fibrous active carbon which constitutes the adsorbent of the present invention may be selected, for example, from coal pitch, petroleum pitch, rayon, phenol fiber, acrylic fiber and the like. The fibrous active carbon may be produced by utilizing the conventional process as disclosed, for example, in U.S. Pat. No. 4,808,202, herein incorporated by reference. The specific surface area of the fibrous active carbon is not particularly limited, provided that the fibrous material has enough pores to adsorb the radioactive nuclides. However, since the adsorbed quantity of radioactive nuclides increases as the specific surface area increases, the fibrous active carbon has a specific surface area of preferably 1,000 m$^2$/g or more, more preferably from 1,500 to 2,500 m$^2$/g. The specific surface area may be controlled by changing the temperature or time with regard to the activating treatment. That is, the activating treatment at a higher temperature or for a longer period causes increase of the specific surface area.

Also, the fibrous active carbon forming the adsorbent has an equilibrium moisture regain of preferably 10% or more, more preferably 15% or more, at a relative humidity of 45%.

The equilibrium moisture regain at a relative humidity of 45% is measured in accordance with *Kagakubinran, Kisohen*, II, p. 143, edited by The Chemical Society of Japan, published by Maruzen Co. That is, a saturated KNO$_2$ solution is placed in a sealed vessel and left at 20° C. until the space of the vessel has a constant humidity (relative humidity: 45%). Then, a sample of fibrous active carbon is placed in the space and left until the amount of water adsorption is saturated. The moisture regain is measured, and the value thus measured is taken as the equilibrium moisture regain at a relative humidity of 45%.

Since active carbon is mainly made of carbon, active carbon is generally non-polar and, therefore, its surface is hydrophobic. Accordingly, active carbon hardly adsorbs moisture at a low relative humidity of about 45%, thus showing a low equilibrium moisture regain.

If active carbon is subjected to a carbonization treatment at a high temperature of from 500° to 1,000° C. during production, polar groups such as carboxyl, carbonyl, hydroxyl and the like groups are formed on the surface of the active carbon. This means that the active carbon becomes hydrophilic although its degree varies depending on the production process. Also, active carbon having high hydrophilic property can be produced by applying an addition treatment to commonly used active carbon as described later. The inventors of the present invention have conducted adsorption tests of radioactive nuclides using various fibrous active carbon preparations with different hydrophilic properties obtained in this method. As a result, they have found that the adsorptivity of fibrous active carbon becomes high as the hydrophilic degree of its surface increases. In other words, it is desirable for the fibrous active carbon to have an equilibrium moisture regain of 10% or more at a relative humidity of 45%.

Although the reason for this is not clear while not desiring to be found, it appears that the capacity of fibrous active carbon to adsorb radioactive nuclides is improved when its surface is hydrophilic, because radioactive nuclides form complex compounds in radioactive liquid waste.

A fibrous active carbon preparation having an equilibrium moisture regain of 10% or more at a relative humidity of 45% may be obtained by subjecting conventional fibrous active carbon to air oxidation, ozone oxidation or liquid phase oxidation, or by adding hydrophilic functional groups to the fibrous active carbon.

The air oxidation treatment may be effected in the atmosphere at a temperature of from 300° to 700° C., preferably from 350° to 600° C. If the temperature is lower than 300° C., a prolonged period of time necessary for the oxidation reaction is required, and if the temperature is higher than 700° C., excess burning occurs reducing the volume of the fibrous active carbon. The oxidation time, although it varies depending on the heating temperature, is generally in the range of from 10 minutes to 5 hours. Alternatively, the air oxidation treatment may be carried out in the stream of heated air.

The ozone oxidation may be effected by oxidizing fibrous active carbon in an ozone-containing atmosphere. The ozone concentration can be in the range of preferably from 100 to 500 ppm, more preferably from 250 to 450 ppm. If the ozone concentration is lower than 100 ppm, a prolonged period of time is necessary for the oxidation reaction, and if the concentration is higher than 500 ppm, the volume of the fibrous active carbon is reduced.

The liquid phase oxidation may be effected by soaking fibrous active carbon in an oxidant solution for a period of from several hours to several days, followed by filtration, washing and drying in that order. The oxidizing agent may be selected from permanganates, chromates, hypochlorites, persulfates, bromic acid ion, chlorine, dilute nitric acid, concentrated nitric acid, hydrogen peroxide and the like.

The functional groups to be added to fibrous active carbon are not particularly limited provided that they are hydrophilic in nature. Examples of suitable functional groups include hydroxyl, carboxyl, carbonyl, primary amino, secondary amino, tertiary amino, quaternary ammonium, sulfonic, phosphonic, ester, amide, nitroso, nitro, thiol, silanol, selenol and the like. Among these groups, hydroxyl, carboxyl, primary amino, secondary amino, tertiary amino, sulfonic, and phosphonic are preferable. These functional groups may be present alone or as a mixture of two or more.

These functional groups can be added to fibrous active carbon for example: by adding a functional group-containing low or high molecular weight compound; by first adding a functional group-containing low molecular weight compound and then converting the thus obtained compound into a high molecular weight compound; by first adding a compound without any functional groups and then adding functional groups to the compound obtained; or by adding functional groups directly to the fibrous active carbon.

When functional groups are added to the fibrous active carbon, the fibrous active carbon may have any optional shape and may therefore be molded into the form of web, sheet, cartridge or the like. Although the specific surface area of the fibrous active carbon decreases due to by the addition of functional groups, it is desirable to maintain the specific surface area at 1,000 m$^2$/g or more even after the addition reaction.

According to the present invention, the fibrous active carbon which is used for the volume-reduction by incineration after adsorption of radioactive nuclides may have a composition in which the total amount of carbon, oxygen and hydrogen is 60% or more, preferably 80% or more. When a total of these components is less than 60%, flameless burning is not achieved appropriately at the time of incineration, and thus a harmful gas is sometimes generated.

According to the present invention, liquid waste which contains radioactive nuclides may be subjected to an adsorption treatment using the adsorbent comprising fibrous active carbon with no pretreatment of the liquid waste, or after improving adsorptivity of the radioactive nuclides to the adsorbent by adding a complexing agent to the radioactive nuclides-bearing liquid waste to form complex compounds with the radioactive nuclides in the liquid waste. Examples of complexing agents which can be used include ethylenediaminetetraacetic acid (EDTA), tributyl phosphate, bis-(2-ethylhexyl) phosphate, mono-2-ethylhexyl 2-ethylhexylphosphonate, triethylamine, trioctylamine, phthalocyanine and the like. Among these agents, tributyl phosphate and bis-(2-ethylhexyl) phosphate are preferable.

Some radioactive nuclides may change their ionic states and dispersion conditions depending on the acid concentration, thus changing their adsorptivity to the fibrous active carbon. For the purpose of improving the adsorptivity, the adsorption treatment may be carried out after adjusting the acid concentration to an appropriate level with the addition of an alkali or acid such as NaOH, HCl, HNO$_3$ or the like, preferably with a 0.01–3N nitric acid solution.

According to the present invention, practical treatment of radioactive liquid waste may be effected by employing any of the prior art means such as a batch method in an adsorption tank, a column process through an adsorption column and a combined means thereof. Alternatively, the fibrous active carbon may be molded into a sheet, a cartridge or the like, and a column process may be carried out using the molded product as an adsorbent. When the shape of adsorbent cannot be produced easily from the fibrous active carbon alone, an inorganic or organic binder may be blended with the fibrous active carbon. Also, the adsorbent may be formed by blending the fibrous active carbon with heat adhesive fibers and thermally fusing them at the time of molding. Examples of such fibers include copolymerized polyester fibers, polyolefin fibers made of polyethylene, polypropylene and the like, low melting point nylon and conjugated fibers made of polyester as the core and polyolefin as the sheath. These binders and fibers may be blended in an amount of 40% by weight or less, because amounts exceeding this range sometimes causes poor incineration.

In the column process, radioactive liquid waste is passed through an adsorption column which has been packed with the adsorbent. The packed adsorbent layer may have a thickness of 200 mm or more, preferably in the range of from 500 to 2,000 mm. If the thickness of the packed layer is less than 200 mm, leakage occurs. Although the liquid passing rate varies depending on the properties of liquid waste to be treated, it is generally 0.5 hr$^{-1}$ or more, preferably in the range of from 1 to 10 hr$^{-1}$, as a space velocity (SV).

In the cartridge process, liquid waste is passed through a cartridge of the fibrous active carbon which has been molded into a cylindrical or columnar form and set in a housing. The use of such a cartridge is quite effective especially when radioactive materials are handled, because it can be installed and detached easily and disposal of the spent cartridge is easy. Such a cartridge may be obtained, for example, by wet-molding the fibrous active carbon, or by firstly molding the fibrous active carbon into a sheet by a paper making process or a dry process and then tightly rolling the molded sheet. When molded into a cartridge, the fibrous active carbon may be blended with a small amount of inorganic and organic binders.

According to the present invention, radioactive liquid waste, which is difficult to treat using prior art processes, can be processed easily, because plutonium can be adsorbed and removed selectively from plutonium-bearing liquid waste, by the use of an adsorbent which comprises fibrous active carbon having excellent selective adsorptivity and durability, especially having a specific surface area of 1,000 m$^2$/g or more and an equilibrium moisture regain of 10% or more at a relative humidity of 45%.

According to the present invention, incineration of the radioactive nuclides-bearing adsorbent after the adsorption treatment can be carried out at a temperature which is equal to or higher than the ignition point of the adsorbent-constituting fibrous active carbon. The term "ignition point" as used herein means the temperature at which the temperature starts to increase sharply when a sample is heated in accordance with the ignition point measurement procedure of JIS-K-1474 (granulated active carbon test methods). When fibrous active carbon is heated at a temperature equal to or higher than its ignition point, it becomes red, starts flameless burning and its volume is reduced. Such a volume reduction seems to occur due to scattering of carbon converted into the form of carbon dioxide, because most portion of the fibrous active carbon is comprises carbon.

As described above, incineration of the adsorbent is carried out at a temperature which is equal to or higher than the ignition point of the adsorbent-constituting fibrous active carbon, but preferably with an upper limit temperature of "ignition point +600° C.". When fibrous active carbon is placed in a temperature atmosphere which is above a temperature of "ignition point +600° C.", carbon bonds are severed by thermal decomposition simultaneously with the burning, thus burning with flames occurs. When fibrous active carbon burns with the emission of flames, some of radioactive nuclides scatter together with the flames, thus an additional gas-adsorbing filter is required. The flameless burning of fibrous activated carbon seems to occur due to its small apparent density (0.05 to 0.3 g/cm$^3$) and high air content necessary for burning, because each fiber has a considerably small diameter (10 to 30 µm) and innumerable pores.

According to the present invention, the radioactive nuclides-bearing adsorbent removed after the adsorption treatment may be subjected to the incineration step as it is, but preferably after dehydration and drying treatments.

As has been described above, according to the present invention, fibrous active carbon is used as an adsorbent and the radioactive nuclides-bearing waste removed after the adsorption treatment is subjected to an incineration treatment, thus making possible a marked reduction in the waste and prevention of the scattering of radioactive nuclides at the time of incineration, without bringing up a problem of the need for extra storage space due to increased amounts of waste.

In addition, since only a burned residue, mainly containing non-volatile radioactive nuclides and co-present metal components, remains as a secondary waste in a very small amount, and the burned residue can be applied to any prior art processing, the process of the present invention does not require any additional special facility and therefore is quite effective from the economic point of view.

The following examples are provided to further illustrate the present invention. It is to be understood, however, that the examples are presented for purpose of illustration only and are not intended as limiting the invention. Unless otherwise indicated, all parts, percents, ratios and the like are by weight.

EXAMPLE 1

A 1 liter capacity beaker was charged with 30 ml of plutonium-bearing liquid waste adjusted to pH 1.6 having a uranium (referred to as "U" hereinafter) concentration of $3.3\times 10^{-2}$ mg/ml and a plutonium (referred to as "Pu" hereinafter) concentration of $3.18\times10^{-3}$ mg/ml and then with 1.0 g of a fibrous active carbon preparation (manufactured by UNITIKA, LTD. under the trade name of A-20; specific surface area, 2,100 m$^2$/g; ignition point, 480° C.; equilibrium moisture regain, 11% at a relative humidity of 45%), and the resulting mixture was subjected to an adsorption treatment at a temperature of 25° C. for 24 hours. This fibrous active carbon adsorbed Pu in an amount of $9.4\times10^{-2}$ mg/g, with an adsorption percentage of 99%.

After the adsorption treatment, the spent fibrous active carbon was dehydrated, dried and then put in a melting pot for incineration for 3 hours of at 600° C. When burned, the fibrous active carbon became red but emitting no flames, and its quantity decreased over time. The residue after incineration was only about 1 mg, and no scattering of radioactive materials was detected.

EXAMPLE 2

A 94 g portion of phenol was put in a 5 liter capacity beaker. With stirring, to this was gradually added 170 g of 98% concentrated sulfuric acid while keeping the phenol temperature at 50° C. or below. To the resulting mixture was further added 9 ml of 37% formaldehyde in the same method, followed by 1 hour of reaction at 70° C. The resulting reaction solution was immediately cooled to room temperature (about 20°–30° C.). To a 72 g portion of the reaction solution was added a mixture of 17.4 g phosphorous acid and 6.2 g ion-exchanged water with stirring, followed by the addition of 74 ml of 37% formaldehyde in the same method. The resulting solution was diluted with 300 ml of water and then mixed with 30 g of a fibrous active carbon preparation (manufactured by UNITIKA, LTD. under the trade name of A-20; specific surface area, 2,110 m$^2$/g). After allowing the fibrous active carbon to contact the reaction solution thoroughly, 9.9 ml of diethylenetriamine was immediately added to the mixture. After 3 hours of reaction at 80° C., the liquid portion of the reaction mixture was removed, and the remaining reaction product was washed with water and then dried at 100° C. for 1.5 hours to obtain a fibrous active carbon preparation (Sample A) to which aminomethylphosphonic acid functional groups had been added. Sample A had a specific surface area of 1,014 m$^2$/g, an ignition point of 480° C. and an equilibrium moisture regain of 43% at a relative humidity of 45%.

A 1 g portion of Sample A was placed in a 1 liter capacity beaker containing 80 ml of the same plutonium-bearing liquid waste as described in Example 1, and the adsorption treatment of Example 1 was repeated. Sample A adsorbed Pu in an amount of about $2.3\times10^{-1}$ mg/g, with an adsorption percentage of 90%.

After the adsorption treatment, the spent Sample A was dehydrated, dried and then placed in a melting pot for incineration at 600° C. for 3 hours. When burned, similar to the case of the fibrous active carbon, Sample A became red but with no emission of flames, and its quantity decreased over time. The residue after the incineration was about 1 mg or less, and no scattering of radioactive materials was detected.

COMPARATIVE EXAMPLE 1

An adsorption treatment of plutonium-bearing liquid waste was carried out in the same method as described in Example 2, except that 1.0 g of a commercially available coconut shell active carbon preparation (granular; specific surface area, 800 m$^2$/g; ignition point, 510° C.) was used. The granular active carbon adsorbed Pu in an amount of about $4.3\times 10^{-2}$ mg/g, with an adsorption percentage of 17%.

After the adsorption treatment, the spent granular active carbon was dehydrated, dried and then placed in a melting pot for incineration at 600° C. for 3 hours. The granular active carbon burned with the emission of flames. About 35 mg of material remained after the incineration as the burning residue of the active carbon, and scattering of radioactive materials was detected around the melting pot.

COMPARATIVE EXAMPLE 2

An adsorption treatment of plutonium-bearing liquid waste was carried out in the same method as described in Example 2, except for the use of 1.0 g of a commercially available chelate resin with aminomethylphosphonic acid functional groups (Unicelec UR-3100, manufactured by UNITIKA, LTD.). The chelate resin adsorbed Pu in an amount of $2.0\times10^{-1}$ mg/g, with an adsorption percentage of 78%.

After the adsorption treatment, the spent chelate resin was dehydrated and placed in a melting pot for incineration at 900° C. for 5 hours. The chelate burned giving forth smoke and flames. About 90 mg of materials remained after the incineration as a foamed carbonized residue which stuck fast to the wall of the melting pot, thus showing extreme difficulty in carrying out the waste treatment. In addition, a large amount of scattering of radioactive nuclides was detected around the melting pot.

EXAMPLE 3

A glass column having an inside diameter of 14.8 mm and a height of 500 mm was packed with 9.0 g of a fibrous active carbon preparation (manufactured by UNITIKA, LTD. under the trade name of A-20; specific surface area, 2,100 $m^2/g$; ignition point, 480° C.; equilibrium moisture regain, 11% at a relative humidity of 45%). The resulting packed layer had a height of 400 mm.

A 400 ml portion of plutonium-bearing liquid waste having a U concentration of 0.26 mg/ml and a Pu concentration of $3.9 \times 10^{-5}$ mg/ml was passed through the thus prepared column at a flow rate of 176 ml/hr. As a result, the packed fibrous active carbon adsorbed $10.0 \times 10^{-3}$ mg of Pu with an adsorption percentage of 64%, and 46 mg of U with an adsorption percentage of 44%.

After the adsorption treatment, the spent fibrous active carbon was dehydrated, dried and then placed in a melting pot for 3 hours of incineration at 550° C. When burned, the fibrous active carbon became red but emitting no flames, and its quantity decreased over time. The residue after the incineration was about 47 mg, and no scattering of radioactive materials was detected.

EXAMPLE 4

The column process of the plutonium-bearing liquid waste of Example 3 was repeated except that Sample A prepared in Example 2 was used as the adsorbent. As a result, the packed Sample A adsorbed $10.0 \times 10^{-3}$ mg of Pu with an adsorption percentage of 64%, and 40 mg of U with an adsorption percentage of 39%.

After the adsorption treatment, spent Sample A was dehydrated, dried and then placed in a melting pot to for 3 hours of incineration at 600° C. When burned, similar to the case of the fibrous active carbon, Sample A became red but emitting no flames, and its quantity decreased over time. The residue after the incineration was about 41 mg, and no scattering of radioactive materials was detected.

EXAMPLE 5

A 3 g portion of a fibrous active carbon preparation (manufactured by UNITIKA, LTD. under the trade name of A-20; specific surface area, 2,116 $m^2/g$) was placed in an electric furnace controlled at 600° C. and subjected to 10 minutes of oxidation reaction to obtain an oxidized active carbon adsorbent. The thus obtained adsorbent was found to have a specific surface area of 2,071 $m^2/g$, an ignition point of 480° C. and an equilibrium moisture regain of 53% at a relative humidity of 45%.

A 0.25 g portion of the adsorbent was soaked in 50 ml of Pu solution having a Pu concentration of $5.0 \times 10^{-3}$ mg/ml and an acid concentration of 1.0N, followed by 120 hours of adsorption treatment. As a result, a Pu-adsorption percentage of 96.1% was obtained.

After the adsorption treatment, the spent fibrous active carbon was dehydrated, dried and then placed in a melting pot to for 3 hours of incineration at 600° C. When burned, the fibrous active carbon became red but emitting no flames, and its quantity decreased over time. The residue after the incineration was 1 mg or less, and no scattering of radioactive materials was detected.

EXAMPLE 6

A 8 g portion of polyethyleneimine having a molecular weight of 600 (Epomin PEI-600, manufactured by Japan Catalytic Chemical Industry Co., Ltd.) was dissolved in 4.5 liters of ion-exchanged water, and 100 g of a fibrous active carbon preparation (manufactured by UNITIKA, LTD. under a trade name of A-20; specific surface area, 2,110 $m^2/g$) was soaked in the polyethyleneimine solution. After standing for 4 hours, 3 g of carbon disulfide was added to the resulting mixture and the mixture was gently stirred at room temperature. When emulsion state of the liquid phase disappeared, the temperature of the mixture was increased to 80° C. and the reaction was continued for 4 hours. After removing the liquid portion, the resulting reaction product was washed thoroughly with hot water and then dried at 50° C. for 4 hours to obtain an adsorbent to which polyethyleneimine functional groups have been added. The thus obtained adsorbent was found to have a specific surface area of 1,420 $m^2/g$, an ignition point of 480° C. and an equilibrium moisture regain of 48% at a relative humidity of 45%.

An adsorption treatment of a Pu solution was carried out in the same method as in Example 5 except that 0.25 g of the thus obtained adsorbent was used. As a result, a Pu-adsorption percentage of 88.3% was obtained.

After the adsorption treatment of the functional group-added adsorbent, the spent adsorbent was dehydrated, dried and then placed in a melting pot for 3 hours of incineration at 600° C. When burned, the functional group-added adsorbent became red but emitting no flames, and its quantity decreased over time. The residue after the incineration was 1 mg or less, and no scattering of radioactive materials was detected.

EXAMPLE 7

A 94 g portion of phenol was placed in a 5 liter capacity beaker. With stirring, to this was gradually added 170 g of 98% concentrated sulfuric acid while keeping the phenol temperature at 50° C. or below. To the resulting mixture was further added 9 ml of 37% formaldehyde in the same method, followed by 1 hour of reaction at 70° C. The resulting reaction solution was immediately cooled to room temperature. To a 8.7 g portion of the reaction solution was added a mixture of 2.1 g phosphorous acid and 0.75 g ion-exchanged water with stirring, followed by the addition of 9.0 ml of 37% formaldehyde in the same method. The resulting solution was diluted with 1,500 ml of water and then mixed with 30 g of a fibrous active carbon preparation (manufactured by UNITIKA, LTD. under the trade name of A-20; specific surface area, 2,110 $m^2/g$). After allowing the fibrous active carbon to contact thoroughly the reaction solution, 1.2 ml of diethylenetriamine was immediately added to the mixture. After 3 hours of reaction at 80° C., the liquid portion of the reaction mixture was removed, and the remaining reaction product was washed with water and then dried at 125° C. for 2 hours to obtain a fibrous active carbon preparation to which aminomethylphosphonic acid functional groups had been added. The thus obtained adsorbent showed a specific surface area of 1,280 $m^2/g$, an ignition point of 480° C. and an equilibrium moisture regain of 41% at a relative humidity of 45%.

An adsorption treatment of a Pu solution was carried out in the same method as in Example 5 except that 0.25 g of the thus obtained adsorbent was used. As a result, a Pu-adsorption percentage of 86.8% was obtained.

After the adsorption treatment of the functional group-added adsorbent, the spent adsorbent was dehydrated, dried and then placed in a melting pot for 3 hours of incineration at 600° C. When burned, the functional group-added adsorbent became red but with no emission of flames, and its quantity decreased over time. The residue after the incineration was about 1 mg or less, and no scattering of radioactive materials was detected.

COMPARATIVE EXAMPLE 3

An adsorption treatment of a plutonium-bearing solution was carried out in the same method as described in Example 5, except that a fibrous active carbon preparation (A-10, manufactured by UNITIKA, LTD.) having a specific surface area of 950 m$^2$/g, an ignition point of 480° C. and an equilibrium moisture regain of 31% at a relative humidity of 45% was used as the adsorbent. As a result, the adsorption percentage of Pu was found to be only 60%.

COMPARATIVE EXAMPLE 4

A 10 g portion of a fibrous active carbon preparation (manufactured by UNITIKA, LTD. under the trade name of A-20; specific surface area, 2,116 m$^2$/g) was placed in an electric tube furnace. On passing hydrogen gas through the furnace at a flow rate of 75 ml/min, the temperature of the furnace was increased to 900° C. at a rate of increase of 300° C./hr and the fibrous active carbon was subjected to 15 minutes of a reduction treatment at the same final temperature. The reduction-treated active carbon adsorbent thus obtained had a specific surface area of 2,060 m$^2$/g, an ignition point of 480° C. and an equilibrium moisture regain of 0.9% at a relative humidity of 45%.

An adsorption treatment of a plutonium-bearing solution was carried out in the same method as described in Example 5, except that the thus obtained adsorbent was used. As a result, the adsorption percentage of Pu was found to be only 50%.

Thus, it is apparent that, in accordance with the present invention, an adsorbent useful for the selective adsorption of radioactive nuclides, as well as a process for the volume reduction of radioactive waste that contains radioactive nuclides are provided.

Since the adsorbent of the present invention which comprises a fibrous active carbon system having an inorganic framework and a specific surface area of 1,000 m$^2$/g or more has a hydrophilic property due to its oxidation treatment, etc. the adsorbent of the present invention possesses excellent durability against radiation and adsorbs transuranium elements selectively.

As a consequence, the use of the inventive adsorbent in the treatment process of radioactive liquid waste renders possible the selective and secure separation and removal of trace amounts of plutonium and the like from the radioactive liquid waste.

Also, according to the present invention, the volume of radioactive nuclides-adsorbed waste can be reduced significantly and scattering of radioactive nuclides at the time of incineration can be prevented, without a problem of securing extra storage space due to increased amounts of waste occurring.

While the invention has been described in detail and with reference to specific embodiments thereof, it will be apparent to one skilled in the art that various changes and modifications can be made therein without departing from the spirit and scope thereof.

What is claimed is:

1. An adsorbent useful for the adsorption of radioactive nuclides comprising fibrous active carbon having a specific surface area of 1,000 m$^2$/g or more, having an equilibrium moisture regain of 10% or more at a relative humidity of 45% and including hydrophilic functional groups.

2. The adsorbent according to claim 1, wherein said fibrous active carbon has a specific surface area of from 1,500 to 2,500 m$^2$/g.

3. The adsorbent according to claim 1, wherein said fibrous active carbon has an equilibrium moisture regain of 15% or more at a relative humidity of 45%.

4. The adsorbent according to claim 2, wherein said fibrous active carbon has an equilibrium moisture regain of 15% or more at a relative humidity of 45%.

5. A process for volume-reduction treatment of radioactive liquid waste which comprises subjecting radioactive liquid waste containing radioactive nuclides to an adsorption treatment using an adsorbent comprising fibrous active carbon having a specific surface area of 1,000 m$^2$/g or more, and subsequently subjecting the spent adsorbent to an incineration treatment at a temperature which is equal to or higher than the ignition point of said fibrous active carbon.

6. The process according to claim 5, wherein said incineration treatment is effected at a temperature which is equal to or higher than the ignition point of said fibrous active carbon but not exceeding a temperature of 600° C. above the ignition point.

7. The process according to claim 5 wherein said adsorbent is the adsorbent of claim 1.

\* \* \* \* \*